US012237621B2

(12) United States Patent
Zhao

(10) Patent No.: US 12,237,621 B2
(45) Date of Patent: Feb. 25, 2025

(54) ELECTRICAL CONNECTOR HAVING A MIDDLE GROUNDING MEMBER ABUTTED BY OUTERMOST GROUND CONTACTS OF FIRST AND SECOND ROWS OF CONTACTS

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Jun Zhao, Huaian (CN)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 351 days.

(21) Appl. No.: 17/951,304

(22) Filed: Sep. 23, 2022

(65) Prior Publication Data

US 2023/0094703 A1 Mar. 30, 2023

(30) Foreign Application Priority Data

Sep. 25, 2021 (CN) .......................... 202111124674.9

(51) Int. Cl.
*H01R 13/6585* (2011.01)
*H01R 13/405* (2006.01)

(52) U.S. Cl.
CPC ....... *H01R 13/6585* (2013.01); *H01R 13/405* (2013.01)

(58) Field of Classification Search
CPC ...... H01R 13/40; H01R 13/41; H01R 13/415; H01R 13/5658; H01R 13/6581; H01R 13/6585; H01R 13/6586; H01R 13/6587; H01R 13/6588
USPC ..................................................... 439/607.05
See application file for complete search history.

(56) References Cited

U.S. PATENT DOCUMENTS

| | | | | |
|---|---|---|---|---|
| 10,553,998 | B2 * | 2/2020 | Tsai | H01R 24/64 |
| 10,720,732 | B2 | 7/2020 | Zhao | |
| 10,797,426 | B2 | 10/2020 | Zhao et al. | |
| 11,245,216 | B2 | 2/2022 | Zhao et al. | |
| 2023/0094703 | A1 * | 3/2023 | Zhao | H01R 13/405 439/607.05 |

FOREIGN PATENT DOCUMENTS

CN 211789687 U 10/2020

* cited by examiner

*Primary Examiner* — Khiem M Nguyen
(74) *Attorney, Agent, or Firm* — Ming Chieh Chang

(57) ABSTRACT

An electrical connector includes: an insulative housing having a front tongue with opposite first and second surfaces; first and second rows of contacts molded with the insulative housing and having respective contacting portions exposed to the first surface of the front tongue, each row of contacts including two outermost ground contacts; and a middle grounding member molded with the insulative housing and disposed between the first row of contacts and the second row of contacts; wherein each of the two outermost ground contacts in the first row has an extending portion abutting against a first surface of the middle grounding member; and each of the two outermost ground contacts in the second row has an extending portion abutting against an opposite second surface of the middle grounding member.

4 Claims, 12 Drawing Sheets

ELECTRICAL CONNECTOR HAVING A MIDDLE GROUNDING MEMBER ABUTTED BY OUTERMOST GROUND CONTACTS OF FIRST AND SECOND ROWS OF CONTACTS

BACKGROUND OF THE INVENTION

Field of the Invention

The present invention relates to an electrical connector comprising: an insulative housing having a front tongue with opposite first and second surfaces; a first row of contacts molded with the insulative housing and having respective contacting portions exposed to the first surface of the front tongue, the first row of contacts including two outermost first ground contacts; a second row of contacts molded with the insulative housing and having respective contacting portions exposed to the second surface of the front tongue, the second row of contacts including two outermost second ground contacts; and a middle grounding member molded with the insulative housing and disposed between the first row of contacts and the second row of contacts, wherein the outermost first and second ground contacts are designed to hold stable during molding process.

DESCRIPTION OF RELATED ARTS

In above-mentioned connectors having outermost ground contacts, only an inner side of the ground contact is supported while an outer side of the ground contact is not properly supported due to space limitation. Such support structure causes the outermost ground contact apt to float during molding operation, which may result in contamination of the ground contact by overflowing molten plastics.

SUMMARY OF THE INVENTION

An electrical connector comprises: an insulative housing having a front tongue with opposite first and second surfaces; a first row of contacts molded with the insulative housing and having respective contacting portions exposed to the first surface of the front tongue, the first row of contacts including two outermost first ground contacts; a second row of contacts molded with the insulative housing and having respective contacting portions exposed to the second surface of the front tongue, the second row of contacts including two outermost second ground contacts; and a middle grounding member molded with the insulative housing and disposed between the first row of contacts and the second row of contacts, wherein each of the two outermost first ground contacts has a respective extending portion abutting against a first surface of the middle grounding member; and each of the two outermost second ground contacts has a respective extending portion abutting against an opposite second surface of the middle grounding member.

DETAILED DESCRIPTION OF THE DRAWINGS

Figure 1:
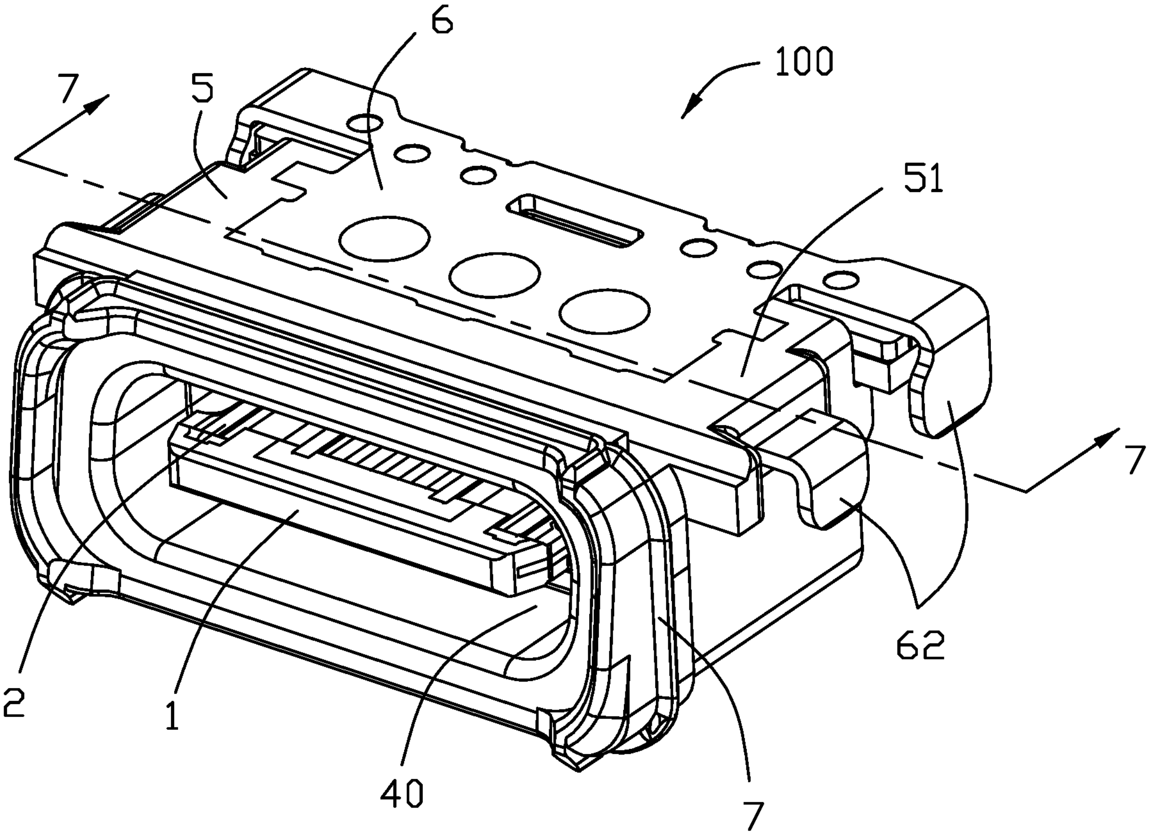
FIG. 1 is a perspective view of an electrical connector in accordance with the present invention.
Figure 2:
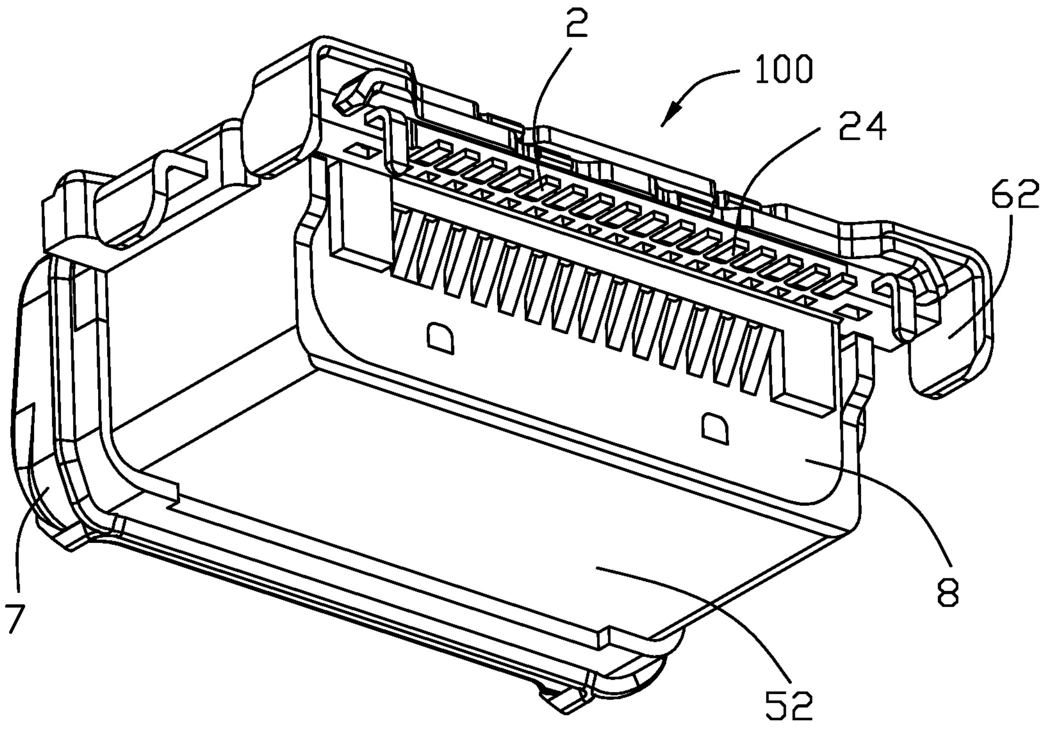
FIG. 2 is another perspective view of the electrical connector.
Figure 3:
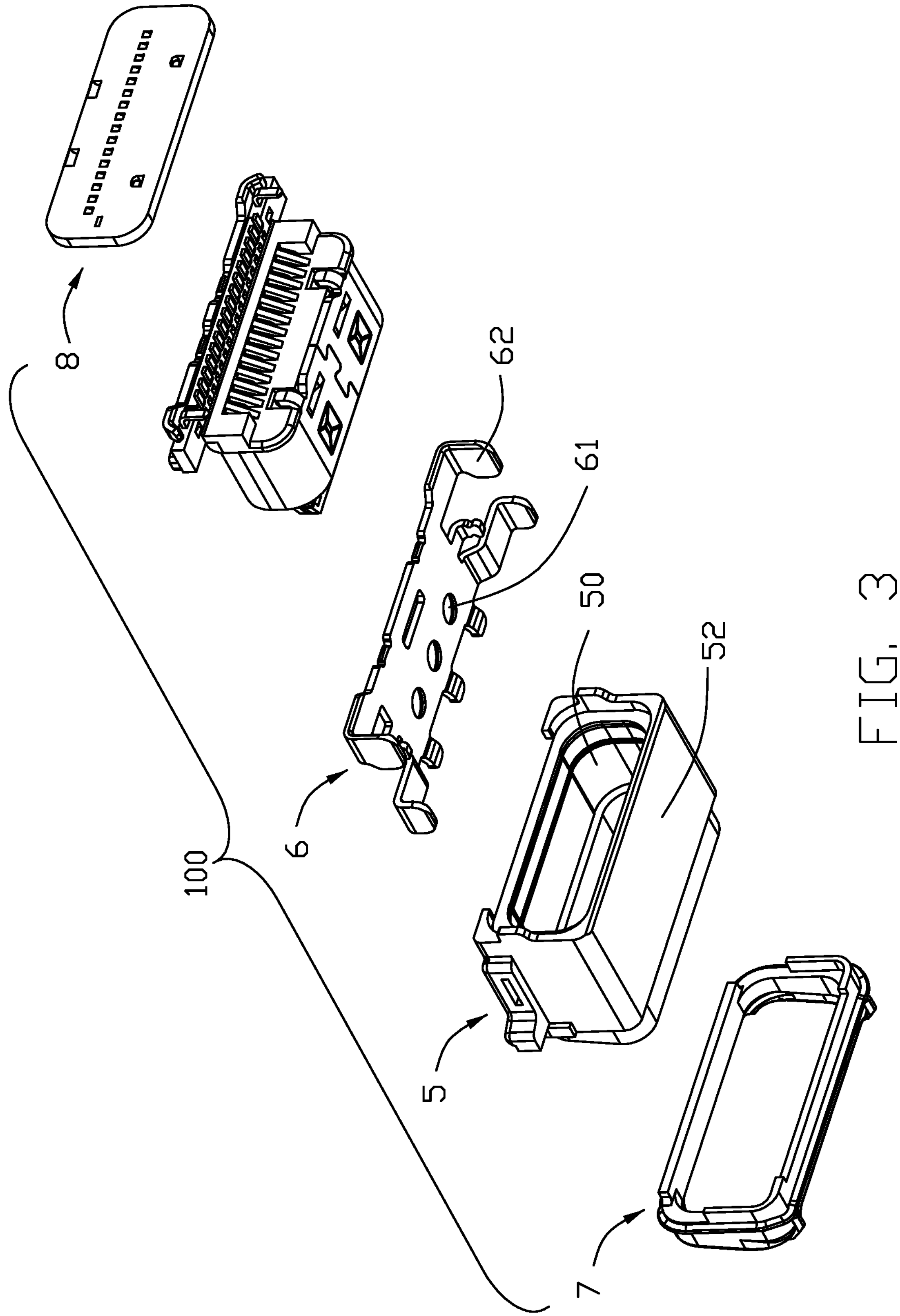
FIG. 3 is an exploded view of the electrical connector.
Figure 4:
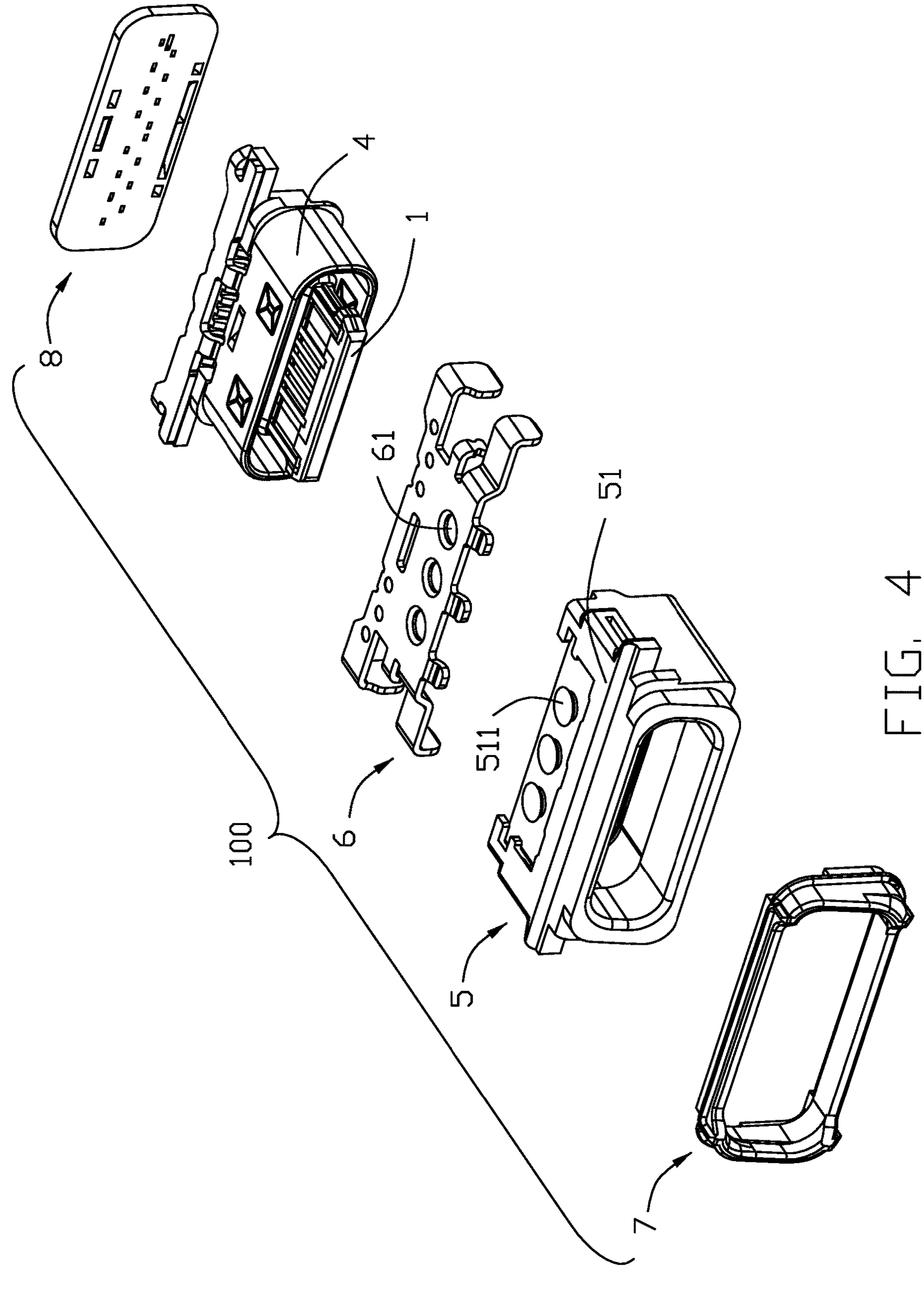
FIG. 4 is another exploded view of the electrical connector.
Figure 5:
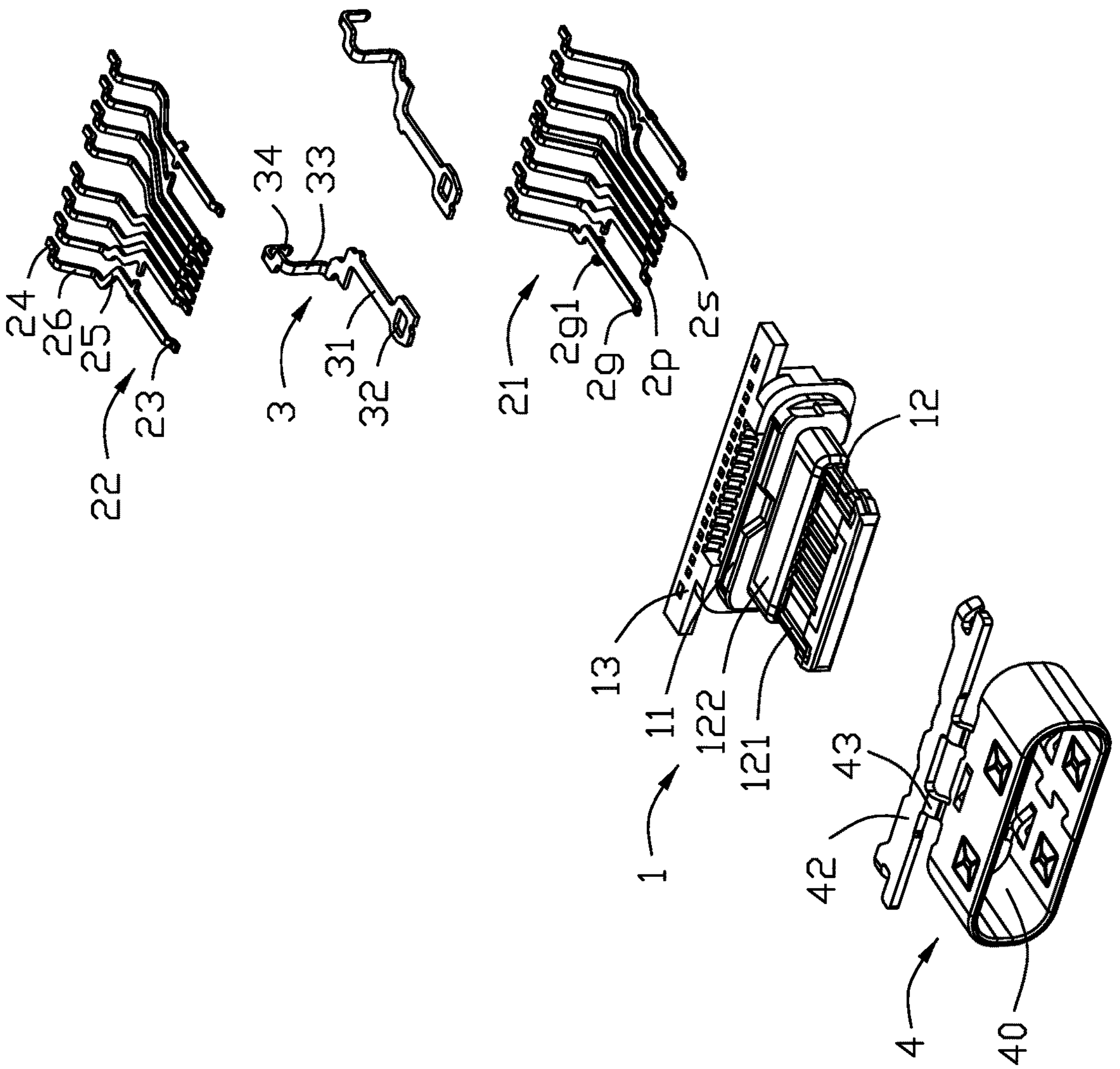
FIG. 5 is a further exploded view of a part of the electrical connector.
Figure 6:
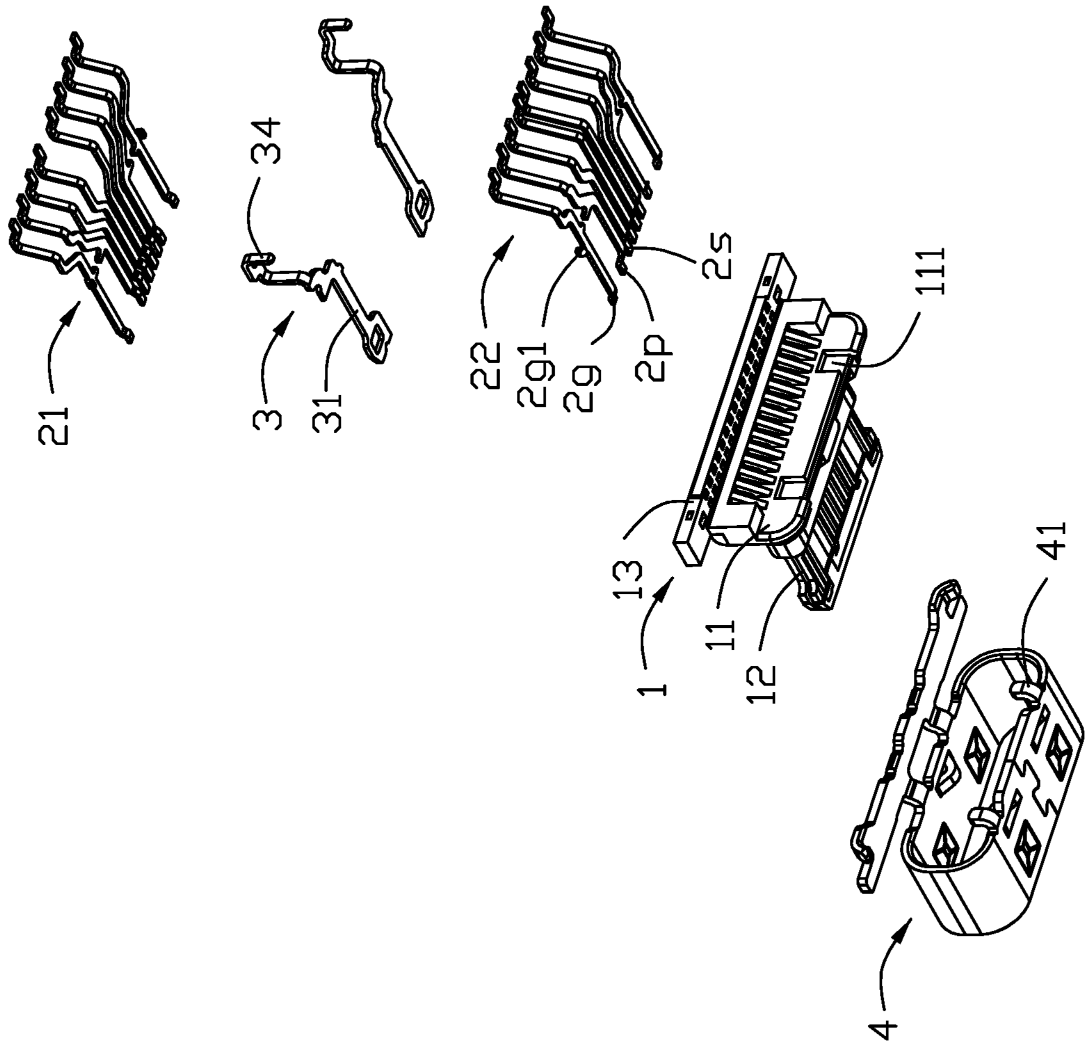
FIG. 6 is a view similar to FIG. 5 but from another perspective.
Figure 7:
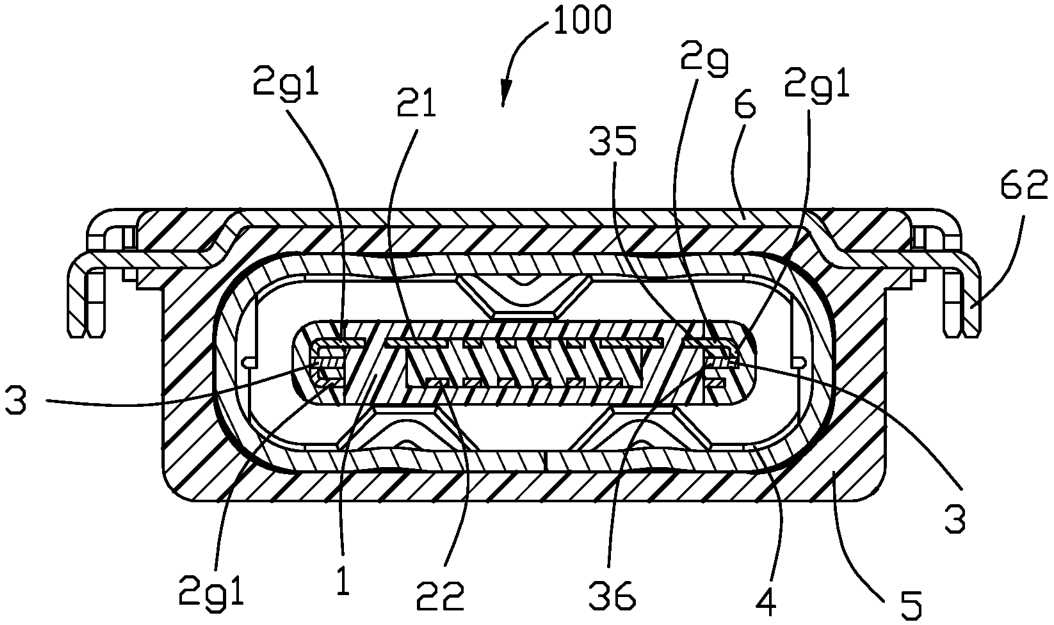
FIG. 7 is a cross-sectional view of the electrical connector taken along line A-A in FIG. 1.
Figure 8:
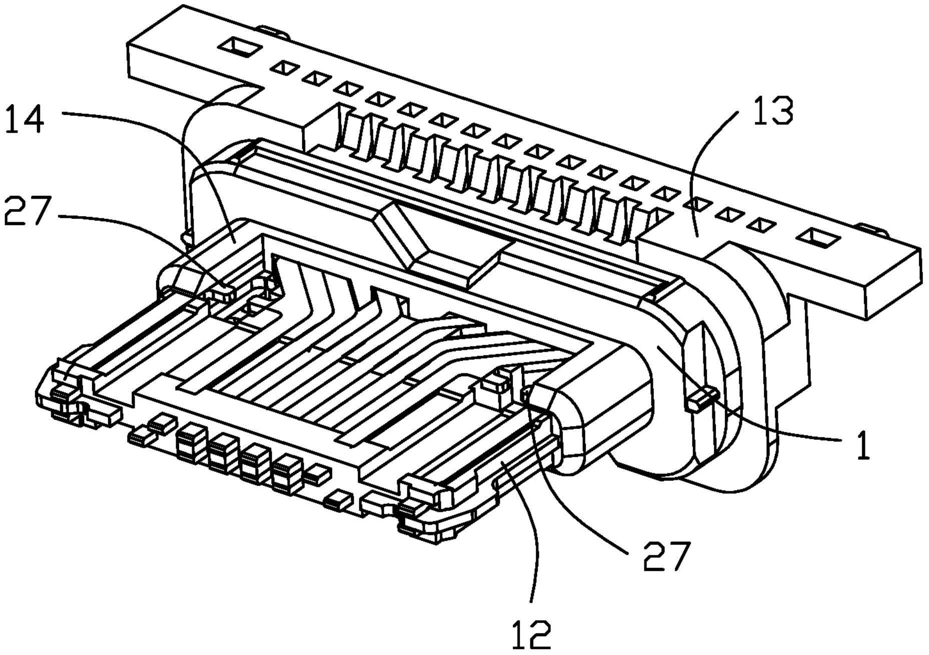
FIG. 8 is a perspective view of a first and second rows of contacts and a middle grounding member of the electrical connector after a first molding process.
Figure 9:
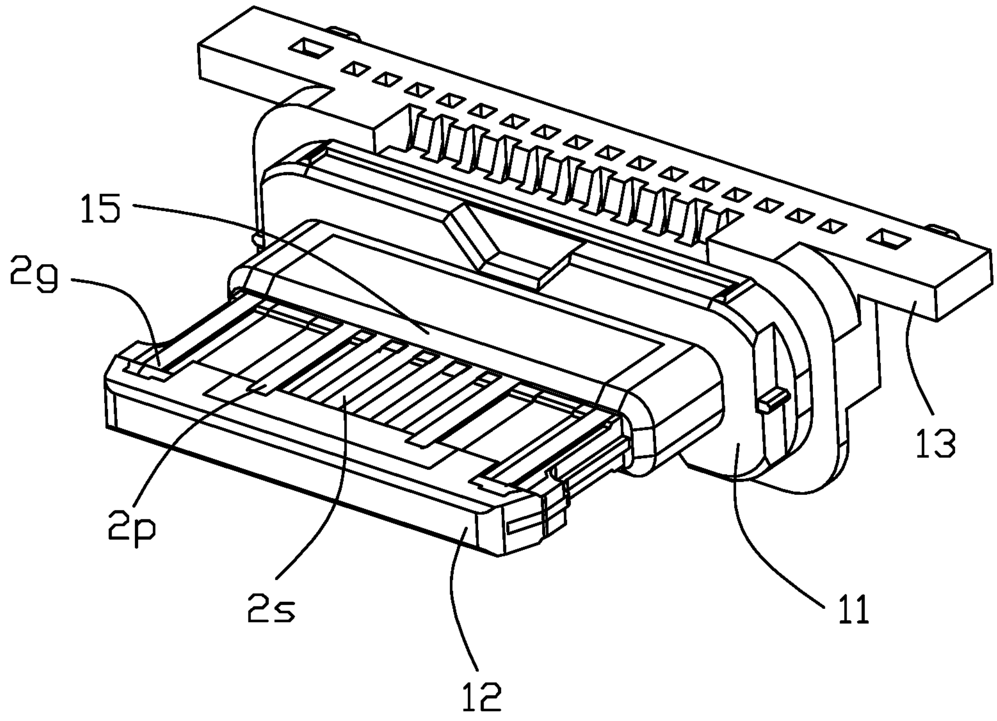
FIG. 9 is a perspective view of the first and second rows of contacts and the middle grounding member of the electrical connector after a second molding process.

Referring to FIGS. 1-12, an electrical connector 100 includes an insulative housing 1, two rows of contacts 2 molded with the insulative housing 1, and a middle grounding member 3 molded with the insulative housing 1 and disposed between the two rows of contacts. The electrical connector 100 may further include a shielding shell 4, an outer cover 5, a mount 6, a front seal 7, and a rear seal 8.

The insulative housing 1 has a base 11 and a front tongue 12. The base 11 has an extension 13. The tongue 12 includes a main body 121 and a rear thickened portion 122 and has opposite first and second surfaces. The insulative housing 1 is constructed of a first insulator 14 from a first molding operation and a second insulator 15 from a second molding operation.

Each of the upper row of contacts 21 and the lower row of contacts 22 has a contacting portion 23 exposed to a corresponding surface of the tongue 12, a tail 24, and a connecting portion 25. The connecting portion 25 may have an inclined segment 26. Each row of contacts include two outermost ground contacts **2*g*, two power contacts 2*p* each spaced two contact positions from an adjacent ground contact 2*g*, and plural signal contacts 2*s* between the two power contacts 2*p*. Each ground contact 2*g* has a horizontal pressing portion 27 at an inner side thereof for cooperating with a molding tool and a substantially vertical extending portion 2*g*1 for abutting against a corresponding one of upper and lower surfaces 35 and 36 of the middle grounding member 3. The extending portion 2*g*1 of the ground contact 2*g* in the upper row may be vertically aligned with the extending portion 2*g*1 of the ground contact 2*g* in the lower row. An outer surface of the extending portion 2*g*1 and an outer surface of the middle grounding member 3 may also be vertically registered. The extending portions 2*g*1 of the outermost ground contacts 2*g* are embedded in the thickened portion 122 of the tongue 12**.

The middle grounding member 3 is constructed as two separate pieces each including a main part 31, a front end 32, and a soldering leg 34. The main part 31 may have a bent segment 33.

During manufacture, each row of contacts 2 are connected at a front thereof to a first carrier strip S1 and connected at a rear thereof to a second carrier strip S2; the middle grounding member 3 is connected at a front and two sides thereof to a third carrier strip S3. The outermost ground contacts **2*g* in the upper and lower rows clamp the middle grounding member 3 in between where the contacts 2 are aligned at the first carrier strips S1 while staggered at the second carrier strips S2**.

The shielding shell 4 defines a space 40 for receiving a contact module consisted of the insulative housing 1, the contacts 2, and the middle grounding member 3. The shielding shell 4 has a pair of clips 41 for engaging notches 111 of the base 11, a plate 42 for engaging the extension 13, and a bridge 43 therebetween. The outer cover 5 defines a space 50 for receiving the shielding shell 4. The outer cover 5 has an upper wall 51 and a lower wall 52. The upper wall 51 has protrusions 511. The mount 6 is insert molded with the outer cover 5 and has holes 61 for the protrusions 511 and fixing legs 62.

Figure 10:
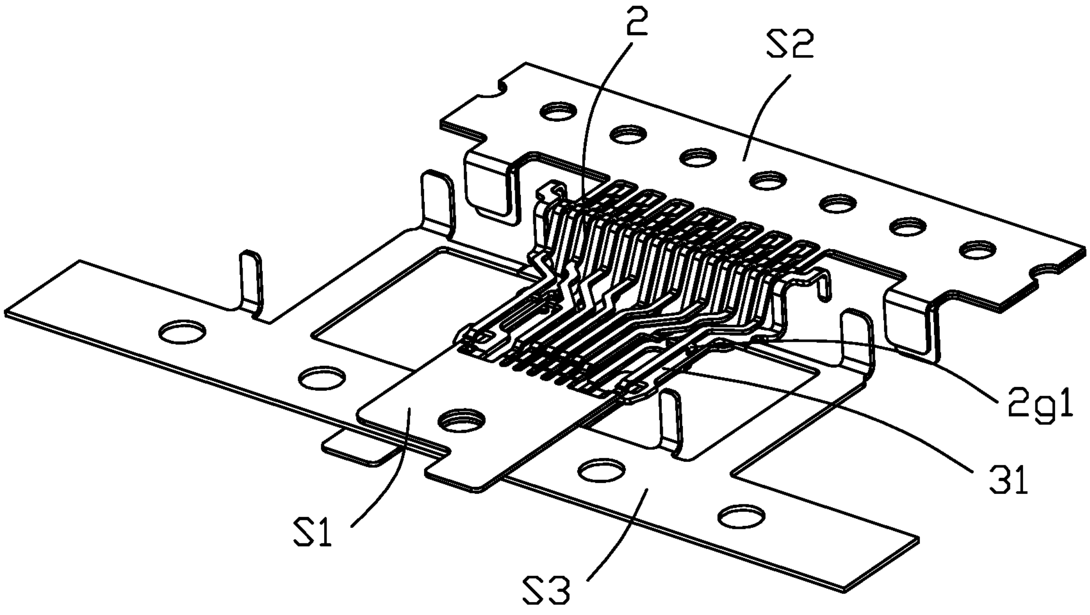
FIG. 10 shows an assembly of a first contact carrier carrying the first row of contacts, a second contact carrier carrying the second row of contacts, and a middle contact carrier carrying the middle grounding member.
Figure 11:
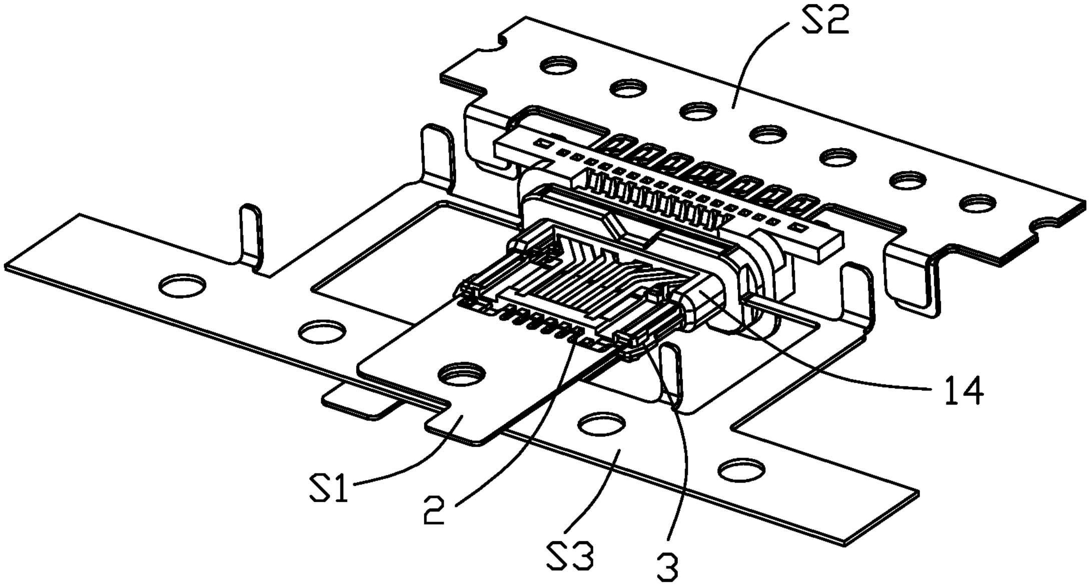
FIG. 11 shows the assembly of FIG. 10 after the first molding process.
Figure 12:
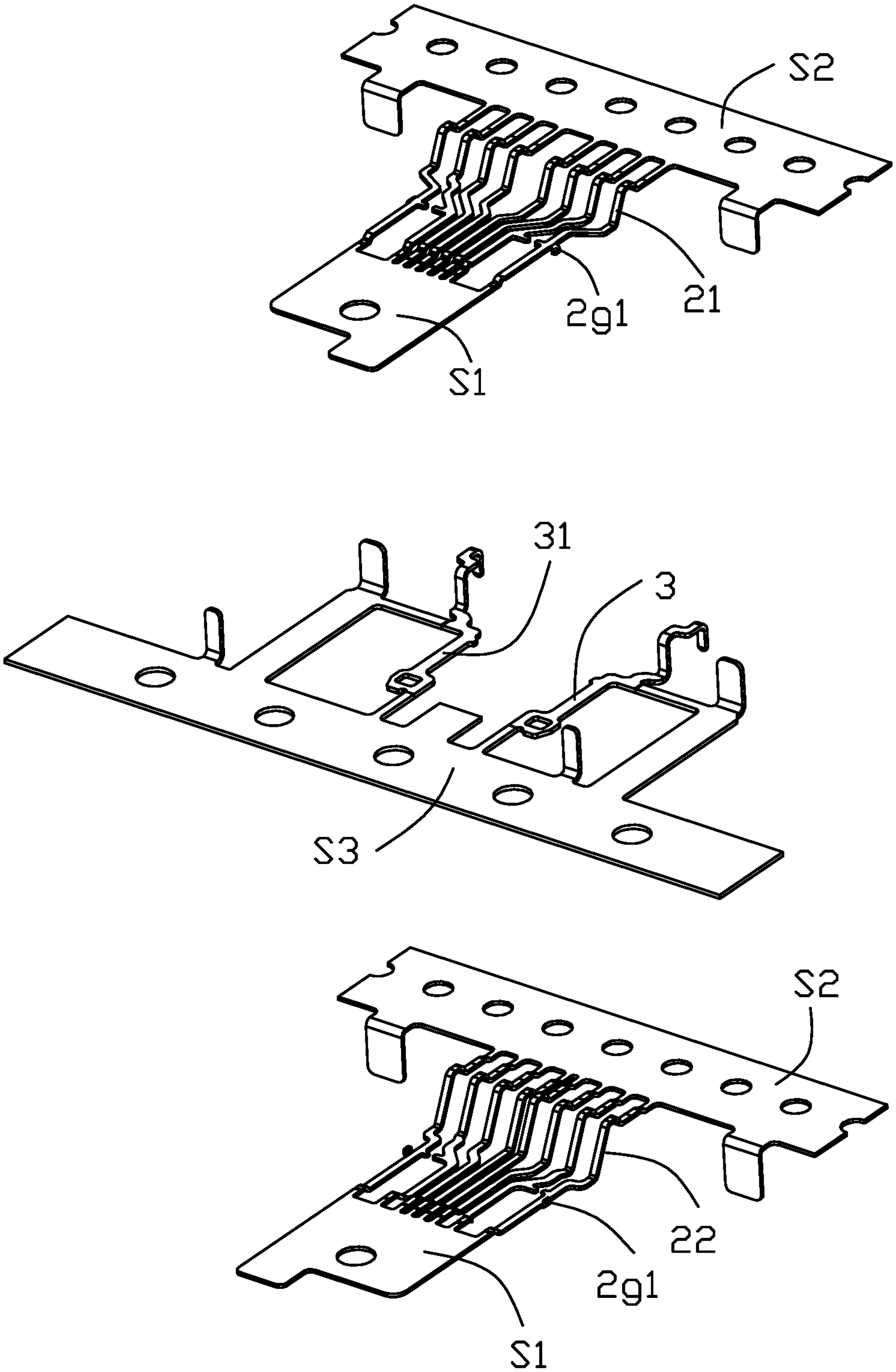
FIG. 12 is an exploded view of the assembly in FIG. 10.

In a method of making the contact module, firstly contact carriers for the upper row of contacts 21, the middle grounding member 3, and the lower row of contacts 22 are separately prepared, as shown in FIG. 12, and then the contact carriers are arranged as shown in FIG. 10 and molded with the first insulator 14 as shown in FIG. 11 while exposing the pressing portion 27 of the ground contact 2*g* as well as the signal contacts 2*s* and similar pressing portion that may be formed on the power contact 2*p*. Before or after removing the one or more of the first through third carrier strips S1, S2, and S3, the second insulator 15 may be suitably molded to complete the insulative housing 1.

What is claimed is:

1. An electrical connector comprising:

an insulative housing having a front tongue with opposite first and second surfaces;

a first row of contacts molded with the insulative housing and having respective contacting portions exposed to the first surface of the front tongue, the first row of contacts including two outermost first ground contacts;

a second row of contacts molded with the insulative housing and having respective contacting portions exposed to the second surface of the front tongue, the second row of contacts including two outermost second ground contacts; and a middle grounding member molded with the insulative housing and disposed between the first row of contacts and the second row of contacts; wherein each of the two outermost first ground contacts has an extending portion abutting against a first surface of the middle grounding member; and each of the two outermost second ground contacts has an extending portion abutting against an opposite second surface of the middle grounding member.

2. The electrical connector as claimed in claim 1, wherein:

the first row of contacts includes two power contacts adjacent to the two outermost first ground contacts, respectively;

the second row of contacts includes two power contacts adjacent to the two outermost second ground contacts, respectively; and each power contact is spaced two contact positions from an associated ground contact.

3. The electrical connector as claimed in claim 1, wherein the front tongue has a thickened portion and the extending portions of the two outermost first ground contacts and the two outermost second ground contacts are embedded in the thickened portion.

4. The electrical connector as claimed in claim 1, wherein the middle grounding member is constructed as two separate grounding pieces.

* * * * *